United States Patent
Sandall et al.

(10) Patent No.: US 11,593,363 B1
(45) Date of Patent: Feb. 28, 2023

(54) COMPREHENSION INDEXING FEATURE

(71) Applicant: Styra, Inc., Redwood City, CA (US)

(72) Inventors: Torin Sandall, San Francisco, CA (US); Timothy L. Hinrichs, Los Altos, CA (US)

(73) Assignee: STYRA, INC., Redwood City, CA (US)

( * ) Notice: Subject to any disclaimer, the term of this patent is extended or adjusted under 35 U.S.C. 154(b) by 0 days.

(21) Appl. No.: 17/239,337

(22) Filed: Apr. 23, 2021

Related U.S. Application Data

(60) Provisional application No. 63/082,405, filed on Sep. 23, 2020.

(51) Int. Cl.
| | |
|---|---|
| *G06F 16/22* | (2019.01) |
| *G06F 16/242* | (2019.01) |
| *G06F 9/54* | (2006.01) |
| *G06F 16/28* | (2019.01) |

(52) U.S. Cl.
CPC .......... *G06F 16/2445* (2019.01); *G06F 9/547* (2013.01); *G06F 16/2246* (2019.01); *G06F 16/2272* (2019.01); *G06F 16/288* (2019.01)

(58) Field of Classification Search
CPC ............. G06F 16/2445; G06F 16/2246; G06F 16/288; G06F 16/2272
See application file for complete search history.

(56) References Cited

U.S. PATENT DOCUMENTS

| | | | |
|---|---|---|---|
| 5,974,549 A | 10/1999 | Golan | |
| 6,985,953 B1 | 1/2006 | Sandhu et al. | |
| 7,124,192 B2 | 10/2006 | High, Jr. et al. | |
| 7,752,661 B2 | 7/2010 | Hemsath et al. | |
| 8,266,694 B1 | 9/2012 | Roy | |
| 8,613,070 B1 | 12/2013 | Borzycki et al. | |
| 8,683,560 B1 | 3/2014 | Brooker et al. | |
| 8,789,138 B2 | 7/2014 | Reierson et al. | |
| 9,397,990 B1 * | 7/2016 | Taly | H04L 63/08 |
| 9,405,767 B2 * | 8/2016 | Novak | G06F 16/16 |
| 9,530,020 B2 | 12/2016 | Brandwine et al. | |
| 9,648,040 B1 | 5/2017 | Morkel et al. | |
| 10,122,757 B1 | 11/2018 | Kruse et al. | |
| 10,127,393 B2 | 11/2018 | Ferraiolo et al. | |

(Continued)

OTHER PUBLICATIONS

Non-Published commonly Owned U.S. Appl. No. 16/050,119, filed Jul. 31, 2018, 55 pages, Styra, Inc.

(Continued)

*Primary Examiner* — Eliyah S. Harper

(74) *Attorney, Agent, or Firm* — Adeli LLP

(57) ABSTRACT

Some embodiments of the invention provide a method for defining code-based policies. The method generates a policy-builder first view of a policy for display in a graphical user interface (GUI) by processing a syntax tree that is generated from a code second view of the policy. The method receives, through the policy-builder first view, a modification to a portion of the policy. To reflect the modification, the method updates a portion of the syntax tree that corresponds to the portion of the policy that is affected by the modification. Based on the updating of the syntax tree, the method updates the code second view by modifying a portion of the code second view that corresponds to the updated portion of the syntax tree.

17 Claims, 9 Drawing Sheets

(56) References Cited

U.S. PATENT DOCUMENTS

| | | | |
|---|---|---|---|
| 10,257,184 B1 | 4/2019 | Mehta et al. | |
| 10,353,726 B2 | 7/2019 | Duan | |
| 10,423,392 B2* | 9/2019 | Rabins | H04W 56/0015 |
| 10,454,975 B1 | 10/2019 | Mehr | |
| 10,469,314 B2 | 11/2019 | Ennis, Jr. et al. | |
| 10,592,302 B1* | 3/2020 | Hinrichs | H04L 63/10 |
| 10,715,514 B1 | 7/2020 | Threlkeld | |
| 10,719,373 B1 | 7/2020 | Koponen et al. | |
| 10,726,051 B2* | 7/2020 | Mirizzi | G06F 16/23 |
| 10,740,287 B2* | 8/2020 | Haviv | G06F 3/0604 |
| 10,789,220 B2 | 9/2020 | Mayer et al. | |
| 10,942,814 B2* | 3/2021 | Chu | G06F 16/24552 |
| 10,984,133 B1 | 4/2021 | Hinrichs et al. | |
| 10,986,131 B1 | 4/2021 | Kruse et al. | |
| 10,990,702 B1 | 4/2021 | Hinrichs et al. | |
| 11,023,292 B1 | 6/2021 | Hinrichs et al. | |
| 11,080,410 B1 | 8/2021 | Sandall et al. | |
| 11,108,827 B2 | 8/2021 | Beckman et al. | |
| 11,108,828 B1 | 8/2021 | Curtis et al. | |
| 11,170,099 B1 | 11/2021 | Sandall et al. | |
| 11,232,223 B2* | 1/2022 | Chasman | G06F 21/6227 |
| 11,245,728 B1 | 2/2022 | Curtis et al. | |
| 11,258,824 B1 | 2/2022 | Hinrichs et al. | |
| 11,275,733 B1* | 3/2022 | Batsakis | G06F 16/24539 |
| 11,327,815 B1 | 5/2022 | Koponen et al. | |
| 2007/0156670 A1 | 7/2007 | Lim | |
| 2009/0063665 A1 | 3/2009 | Bagepalli et al. | |
| 2009/0077618 A1* | 3/2009 | Pearce | H04L 63/0892 726/1 |
| 2010/0333079 A1 | 12/2010 | Sverdlov et al. | |
| 2011/0113484 A1 | 5/2011 | Zeuthen | |
| 2012/0030354 A1 | 2/2012 | Razzaq et al. | |
| 2012/0311672 A1 | 12/2012 | Connor et al. | |
| 2012/0331539 A1 | 12/2012 | Matsugashita | |
| 2013/0226970 A1 | 8/2013 | Weber et al. | |
| 2014/0032691 A1 | 1/2014 | Barton et al. | |
| 2014/0032759 A1 | 1/2014 | Barton et al. | |
| 2014/0033267 A1 | 1/2014 | Aciicmez | |
| 2014/0237594 A1 | 8/2014 | Thakadu et al. | |
| 2015/0089575 A1* | 3/2015 | Vepa | H04L 63/08 726/1 |
| 2016/0057107 A1 | 2/2016 | Call et al. | |
| 2017/0161120 A1 | 6/2017 | Sasaki et al. | |
| 2017/0220370 A1 | 8/2017 | Klompje et al. | |
| 2017/0237729 A1 | 8/2017 | Uppalapati | |
| 2017/0346807 A1 | 11/2017 | Blasi | |
| 2017/0364702 A1* | 12/2017 | Goldfarb et al. | |
| 2018/0067790 A1 | 3/2018 | Chheda et al. | |
| 2018/0082053 A1 | 3/2018 | Brown et al. | |
| 2018/0109538 A1 | 4/2018 | Kumar et al. | |
| 2018/0309746 A1 | 10/2018 | Blasi | |
| 2019/0007418 A1 | 1/2019 | Cook et al. | |
| 2019/0007443 A1 | 1/2019 | Cook et al. | |
| 2019/0230130 A1 | 7/2019 | Beckman et al. | |
| 2019/0245862 A1 | 8/2019 | Kruse et al. | |
| 2019/0386973 A1 | 12/2019 | Patwardhan et al. | |
| 2020/0007580 A1* | 1/2020 | Liderman | H04W 12/068 |
| 2021/0029029 A1 | 1/2021 | Mehmedagic et al. | |
| 2021/0240550 A1 | 8/2021 | Hinrichs et al. | |
| 2021/0248017 A1 | 8/2021 | Hinrichs et al. | |
| 2021/0365571 A1 | 11/2021 | Sandall et al. | |

OTHER PUBLICATIONS

Non-Published commonly Owned U.S. Appl. No. 16/050,123, filed Jul. 31, 2018, 56 pages, Styra, Inc.

Non-Published commonly Owned U.S. Appl. No. 16/050,143, filed Jul. 31, 2018, 56 pages, Styra, Inc.

Author Unknown, "API Best Practices Managing the API Lifecycle: Design, Delivery, and Everything in Between," Dec. 2016, 37 pages, Apigee, retrieved from https://pages.apigee.com/rs/351-WXY-166/images/API-Best-Practices-ebook-2016-12.pdf.

Costa, Jeff, "Improve API Performance with Caching," API Gateway, May 3, 2018, 18 pages, Akamai Developer, retrieved from https://developer.akamai.com/blog/2018/05/31/improve-api-performance-caching.

Win, Thu Yein, et al., "Virtualization Security Combining Mandatory Access Control and Virtual Machine Introspection," 2014 IEEE/ACM 7th International Conference on Utility and Cloud Computing, Dec. 8-11, 2014, IEEE, London, UK.

* cited by examiner

COMPREHENSION INDEXING FEATURE

BACKGROUND

Most applications today use access control rules to allow different users with different privileges, different access to the applications and their resources. Typically, evaluating these rules and policies can be time consuming and inefficient. This issue is especially acute for polices that require aggregation operations on large data sets. Additionally, certain declarative languages used to define these rules and policies do not provide users with a way to perform large aggregations of data, and also may not support mutation. Accordingly, certain functions and operations like "group by" cannot currently be performed.

BRIEF SUMMARY

Some embodiments of the invention provide a method for optimizing performance for policies that perform search operations on datasets. The method is performed by a policy agent (e.g., OPA (opensource policy agent)) that executes on a host computer to authorize API calls made to at least one application executing on the host computer. For a particular policy, the policy agent performs an offline first process ("offline process") to identify one or more statements in the particular policy that can be indexed. The policy agent then generates an index to map each identified statement to a set of associated index keys. For each statement in the generated index, the policy agent performs an online second process ("online process") to evaluate the statement using any available input data (e.g., data extracted from an API call), and generates a tree structure for the indexed statement using the results of the evaluation. The generated tree structures, in some embodiments, are each keyed by the set of associated index keys from the index.

The offline and online processes, in some embodiments, are referred to herein as a comprehension indexing feature. Indices can be generated, in some embodiments, for comprehensions that generate collections based on variables in an outer query. In order for a statement in a policy to be indexed, it must meet certain conditions, according to some embodiments. For example, the statement (1) must appear in an assignment or unification statement, (2) must not include a "with" statement, (3) must not be part of a negated expression, (4) includes a body that is safe when considered independent from the outer query, and (5) includes a body that closes over at least one variable in the outer query and none of these variables appear as outputs in references of "walk( )" calls or inside nested comprehensions.

In some embodiments, the policy agent continuously analyzes policies and generates indices when applicable in order to keep all of the policies up-to-date and available for evaluation. Alternatively, or conjunctively, the policy agent in some embodiments performs the offline process and the online process in response to receiving an API-authorization request from the application executing on the host computer. As the indices are generated, the policy agent stores them in a storage structure for later retrieval. In some embodiments, the index keys used to key the indices correspond to names of variables in the corresponding policy, and are organized deterministically.

When the policy agent is evaluating and authorizing an API-authorization request or API call in some embodiments, it first checks the storage structure to determine if any indices corresponding to an applicable policy have been generated and are available for use in evaluating the policy. In some embodiments, the indices are stored in memory for constant retrieval and evaluation by the policy agent. When the policy agent determines that no indices corresponding to the policy have been generated, it performs a standard evaluation of the policy. When the policy agent determines that an index corresponding to the policy has been generated, it retrieves the index and evaluates each statement in the policy using the index keys.

In some embodiments, after evaluating each statement, the policy agent checks another storage structure to determine whether any tree structures corresponding to statements in the retrieved index have been previously computed and stored. When there are previously generated tree structures, the policy agent in some embodiments uses these tree structures to evaluate and process API-authorization request. Otherwise, the policy agent computes the policy using the index and available input, and, for each statement in the index, caches the results of the evaluation in a tree structure. The policy agent then stores the generated tree structures for later use, according to some embodiments. The policy agent in some embodiments only computes a tree structure for each statement in the policy once, unless updates to the policy are received.

In some embodiments, each of the generated tree structures includes subtrees for each variable in the statement, and leaves corresponding to the possible values of each of those variables. As mentioned above, the policy agent evaluates each statement in a policy in full using the available input data (e.g., data extracted from a received API-authorization request). Thus, when evaluating an API-authorization policy using the generated tree structures, the policy agent can quickly and simply traverse the tree structure to identify desired values for one or more variables for each statement based on the input data.

The policy agent in some embodiments includes multiple components for performing the offline process and the online process. For example, the policy agent in some embodiments includes a policy fetching component that retrieves polices for indexing and evaluation from a local namespace. After retrieving a policy, the policy fetching component provides the policy to a rule compiling component of the policy agent, which performs the offline process to generate the indices, and stores the generated indices in a first storage structure for retrieval by an evaluation engine component of the policy agent.

The evaluation engine then retrieves the indices when required to evaluate an API call or API-authorization request, according to some embodiments. The evaluation engine then performs the online process using the retrieved indices in order to generate the tree structures for each indexed statement in the indices and evaluate API calls and API-authorization requests. In some embodiments, the evaluation engine stores the results of the evaluation and the generated tree structures in a second storage structure for later use. Doing so allows the evaluation engine, and policy agent as a whole, to run more quickly and efficiently when evaluating the same API calls and API-authorization requests.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1A:
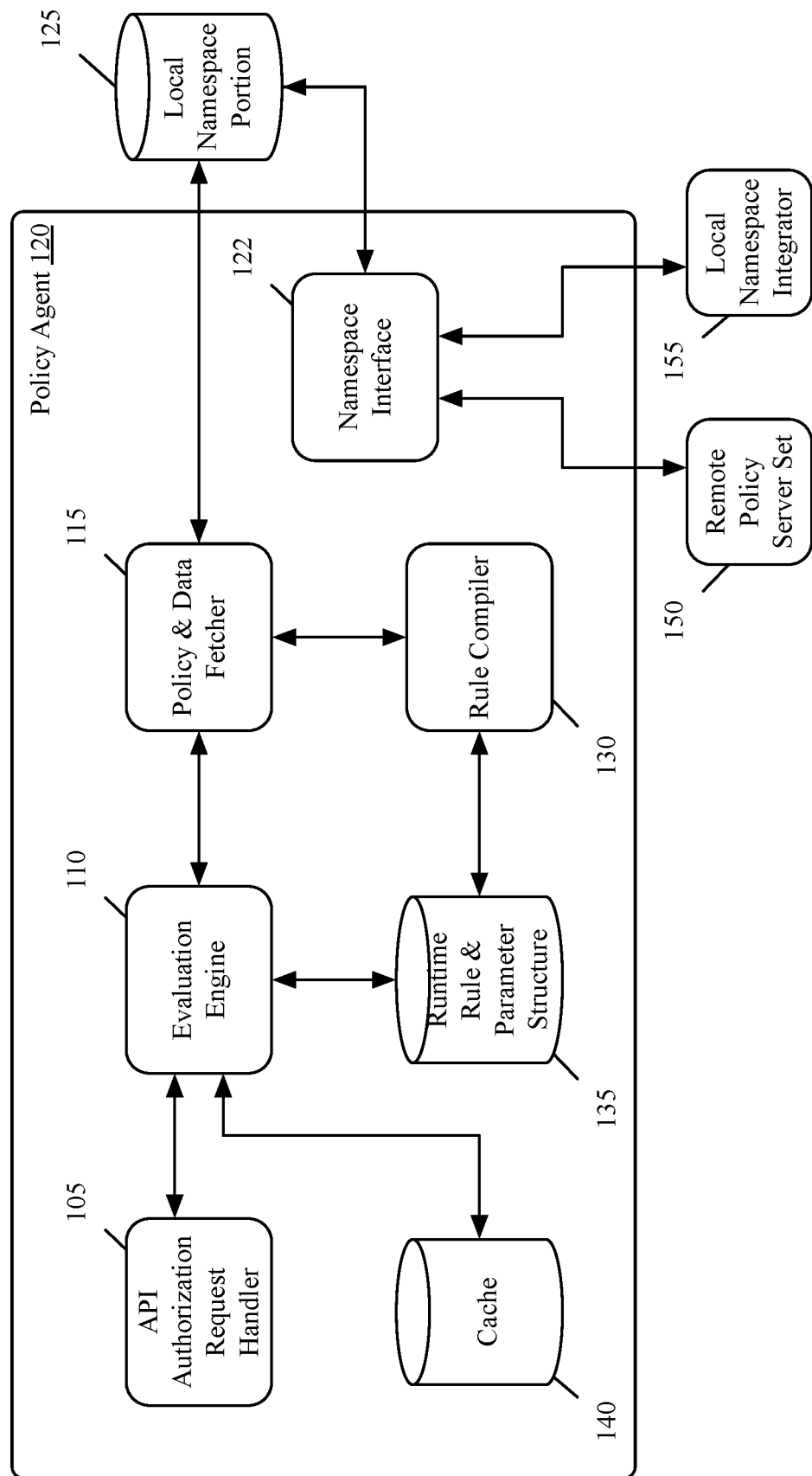
FIG. 1A-1C conceptually illustrate a detailed view of a policy agent as it performs the offline and online processes, according to some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for optimizing performance for policies that perform search operations on datasets. The method is performed by a policy agent (e.g., OPA) that executes on a host computer to authorize API calls made to at least one application executing on the host computer. For a particular policy, the policy agent performs an offline first process ("offline process") to identify one or more statements in the particular policy that can be indexed. The policy agent then generates an index to map each identified statement to a set of associated index keys. For each statement in the generated index, the policy agent performs an online second process ("online process") to evaluate the statement using any available input data (e.g., data extracted from an API call), and generates a tree structure for the indexed statement using the results of the evaluation. The generated tree structures, in some embodiments, are keyed by the set of associated index keys from the index.

The offline and online processes, in some embodiments, are referred to herein as a comprehension indexing feature. Indices can be generated, in some embodiments, for comprehensions that generate collections based on variables in an outer query. In order for a statement in a policy to be indexed, it must meet certain conditions, according to some embodiments. For example, in some embodiments the statement (1) must appear in an assignment or unification statement, (2) must not include a "with" statement, (3) must not be part of a negated expression, (4) must include a body that is safe when considered independent from the outer query, and (5) must include a body that closes over at least one variable in the outer query, with none of these variables appearing as outputs in references of "walk( )" calls or inside nested comprehensions.

In some embodiments, the policy agent continuously analyzes policies and generates indices when applicable in order to keep all of the policies up-to-date and available for evaluation. Alternatively, or conjunctively, the policy agent in some embodiments performs the offline process and the online process in response to receiving an API-authorization request from the application executing on the host computer. As the indices are generated, the policy agent stores them in a storage structure for later retrieval. In some embodiments, the index keys used to key the indices correspond to names of variables in the corresponding policy, and are organized deterministically.

When the policy agent is evaluating and authorizing an API-authorization request in some embodiments, it first checks the storage structure to determine if any indices corresponding to an applicable policy have been generated and are available for use in evaluating the policy. In some embodiments, the indices are stored in memory for constant retrieval and evaluation by the policy agent. When the policy agent determines that no indices corresponding to the policy have been generated, it performs a standard evaluation of the policy. Otherwise, when the policy agent determines that an index corresponding to the policy has been generated, it retrieves the index and evaluates each statement in the policy using the index keys.

In some embodiments, after evaluating each statement, the policy agent checks a second storage structure to determine whether any tree structures corresponding to statements in the retrieved index have been previously computed and cached. When there are previously generated tree structures in the second storage structure, the policy agent in some embodiments uses these tree structures to evaluate and process the API-authorization request. Otherwise, the policy agent performs the computation and evaluation for each statement using the retrieved index and any available input and caches the results of each evaluation in a tree structure. The policy agent then stores any generated tree structures in the second storage structure for later use, according to some embodiments. The policy agent in some embodiments only computes a tree structure for each statement in the policy once, unless updates to the policy are received.

In some embodiments, each of the generated tree structures includes subtrees for each variable in the statement, and leaves corresponding to the possible values of each of those variables. As mentioned above, the policy agent evaluates each statement in a policy in full using the available input data (e.g., data extracted from a received API-authorization request). Thus, when evaluating an API-authorization policy using the generated tree structures, the policy agent can quickly and simply traverse the tree structure to identify values for one or more variables for each statement based on the input data.

The policy agent in some embodiments includes multiple components for performing the offline process and the online process. For example, the policy agent in some embodiments includes a policy fetching component that retrieves polices for indexing and evaluation from a local namespace. After retrieving a policy, the policy fetching component provides the policy to a rule compiling component of the policy agent, which performs the offline process to generate the indices, and stores the generated indices in a first storage structure for retrieval by an evaluation engine component of the policy agent.

The evaluation engine then retrieves the indices when required to evaluate an API-authorization request, according to some embodiments. The evaluation engine then performs the online process using the retrieved indices in order to generate the tree structures for each indexed statement in the indices and evaluate API-authorization requests. In some embodiments, the evaluation engine stores the results of the evaluation and the generated tree structures in a second storage structure for later use. Doing so allows the evaluation engine, and policy agent as a whole, to run more quickly and efficiently when evaluating the same API-authorization requests. Additional details regarding the offline and online processes that make up the comprehension indexing, and the components of the policy agent that are configured to perform these processes, will be described further below.

FIG. 1A illustrates a detailed view of a local policy agent 120 of some embodiments. In this example, the local agent 120 uses a local namespace portion 125 as a local policy and data storage. This namespace contains both (1) policy opcodes to evaluate API calls to determine whether they should be authorized, and (2) operands to use to evaluate and resolve the opcodes. In some embodiments, the namespace portion 125 contains the policy opcodes and operands needed for the API calls that are received by one or more applications on the agent's host that use the local agent. In other embodiments, the local agent has a different namespace portion for different applications.

The local policy agent 120, in some embodiments, is a general-purpose policy engine that decouples policy decision-making from policy enforcement. For example, some embodiments utilize open policy agents (OPAs), which are open source, general-purpose policy engines for enforcing policies in micro-services, Kubernetes, CI/DC pipelines, API gateways, etc. OPA operates by generating policy decisions based on evaluations of query input against policies (e.g., opcodes) and stored data (e.g., operands). Additional information regarding OPAs can be found at www.openpolicyagent.org.

The local agent 120 has a namespace interface 122 that receives and stores the namespace portion and updates to all or part of this portion from the remote policy server set 150. This interface also receives policy operands from local parameter integrator 155, which can be used in some deployments to store policy operands in the namespace that are not provided to the server set 150 (e.g., to maintain the confidentiality of such policy operands). Upon the initialization of the local agent 120, the namespace interface 122 in some embodiments initially queries the server set to obtain the namespace(s) for the applications that will use the local agent. Also, in some embodiments, the namespace interface 122 periodically polls the server set to determine whether any policy or operand in its namespace has been added, deleted or modified, and if so, the namespace interface updates its local namespace portion 125 to reflect this change (e.g., to download any new and/or modified policy and/or operand and store the downloaded policy and/or operand in the namespace portion).

The server set 150 in some embodiments receives and stores definitions of several authorization policies for several API calls to one or more applications executing on a set of associated machines. In some embodiments, the sever set can receive the policies through a web-based user interface (e.g., a web browser) or some other interface (e.g., an API interface that supports receiving policies from other applications). The server set in some embodiments allows these policies to be custom defined in terms of different sets of parameters for the different sets of applications that are used in the different deployment settings in which the server set is employed (e.g., for different tenants in a multi-tenant datacenter or different departments or divisions of a multi-department or multi-division entity).

Through one or more interfaces (e.g., web-based interfaces or other interfaces), the server set in some embodiments collects and stores parameters for evaluating the authorization policies to assess whether API calls should be authorized. For one or more sources (e.g., LDAP directories, etc.) in the datacenter(s) (not shown), the server set in some embodiments has one or more data-source adapters that collect parameters from these data sources and store these parameters in order to evaluate the authorization policies to assess whether API calls should be authorized. The server set also allows such parameters to be entered through a web-based user interface.

The collected parameters in some embodiments are specific to each set of related machines (e.g., for each tenant in a multi-tenant datacenter or each department or division of a multi-department or multi-division entity) for which the server set defines and distributes policies. The server set in some embodiments updates these parameters dynamically in real time. Accordingly, in some embodiments, the server set uses, collects and updates parameters for resolving policies dynamically and in a deployment specific manner (i.e., in a manner that can be context specific for each set of associated machines for which the server set is deployed). The dynamic and deployment-specific way that the server set collects and updates policy-resolving parameters greatly enhances the configurability of the sever set in each deployment. This is because the server set not only allows custom policies to be defined for each deployment based on the deployment-setting specific parameters, but also allows these policies to be resolved based on dynamically changeable parameters for each specific deployment.

For each set of related machines, the server set in some embodiments stores the defined API-authorization policies, and collected parameters needed to resolve these policies, in a single hierarchical storage structure (such as a namespace) that can be accessed as a single runtime storage construct. The server set in some embodiments includes several modules for maintaining the policy and parameters in this runtime storage structure up to date. For instance, as mentioned above, the server set in some embodiments has one or more data-source adapters that receive and/or collect policy-resolving parameters for storage in the runtime hierarchical storage structure.

The server set in some embodiments identifies updates to parameters for evaluating the policies and stores these updates in this storage structure along with the authorization policies. In some embodiments, the runtime storage structure (e.g., the namespace) stores the policy for authorizing each API call as one or more lines of opcode (as one or more opcode expressions/statements). Each such policy is referred to as policy opcode in the discussion below. Also, policy operands in the discussion below refer to the parameters that are needed to resolve the policy opcodes for the API calls. The single storage structure stores such policy operands along with the policy opcodes. Policy operands can also accompany the API calls, or the API-authorization requests that are generated in response to such API calls.

In some embodiments, the server set distributes the defined policies and parameters to policy-enforcing local agents that execute near the applications that process the API calls. Different embodiments place the local agents in different positions with respect to their associated applications, as further described below. In some embodiments, the server set distributes different sets of policies and parameters to different local agents based on the policies that are relevant to the API-authorization processing for the applications associated with those agents.

In addition to the namespace interface 122, the local agent 120 includes a request handler 105, evaluation engine 110, policy and data fetcher 115, and rule compiler 130. The API-authorization request handler 105 is responsible for receiving API-authorization requests from one or more applications (not shown) executing on the same host computer (not shown) as the local agent. These requests are received in some embodiments as RPC messages that each include a set of parameters associated with an API call that the application has received. In some embodiments, this parameter set includes a parameter that identifies the API call and one or more metadata parameters associated with the API call. Also, in some embodiments, this parameter set includes one or more parameters that the local agent needs to resolve policy opcode that is associated with the API call. Accordingly, after receiving the RPC message, the handler 105 in some embodiments extracts this parameter set from the RPC message's payload and provides this parameter set to the evaluation engine 110. This parameter set identifies the API call as mentioned above.

The evaluation engine is responsible for evaluating policy opcode related to the API call (i.e., the API call specified in the API-authorization RPC message) based on one or more parameters received with the RPC message and/or retrieved from the local namespace. Before evaluating this opcode based on one or more associated parameters, the evaluation engine needs the policy and data fetcher 115 to retrieve from the local namespace portion 125 the policy opcode and operands applicable to the identified API call, and the rule compiler 130 to create a more optimal runtime rule and parameter structure 135 for the evaluation engine to process. The evaluation engine also stores compiled rule structures for prior API-authorization requests in a cache storage 140 as will be further described below, so that it can forego retrieving and compiling the same policy opcode/operands when it subsequently receives the same API call.

In view of this functionality, after identifying the API call associated with the received request, the evaluation engine in some embodiments determines whether the cache storage 140 stores a reference to a rule structure for this API call that was previously compiled when the local agent received the same API-authorization request previously. In some embodiments, the cache 140 identifies each stored rule structure in terms of one or more parameters that are passed along with the API-authorization request to the local agent 120 by the application. Hence, in these embodiments, the evaluation engine determines whether the parameters passed along with the current request match the parameters stored for the rule structures identified in the cache storage 140.

If so, the evaluation engine processes this previously specified rule structure to formulate its decision, and then provides this decision (i.e., its "authorization" or "rejection") to the request handler 105. The API handler 105 in some embodiments then formulates an RPC reply message with this decision in its payload and sends this reply message to the application that sent the request.

On the other hand, when the evaluation engine determines that the cache storage does not store a reference to a previously defined rule structure for the API call identified in the received request, the evaluation engine in some embodiments directs the policy and data fetcher 115 to retrieve from the local namespace portion 125 the policy opcode and operands applicable to the identified API call. The namespace in some embodiments is a hierarchical structure that stores policy opcode associated with an API call in a location (e.g., a path) in the structure that can be specifically identified based on the API call's identifier (e.g., the name associated with the API call). In some embodiments, this location also stores the operands needed for processing this policy opcode and/or stores a location identifier (e.g., the path) that specifies other location(s) in the namespace that store the operands needed for processing the policy opcode. Hence, in some embodiments, the fetcher 115 can easily identify the policy opcode and operands to retrieve by just using parameters associated with the API call.

In some embodiments, after retrieving the policy opcode and one or more associated operands, the fetcher 115 directs the rule compiler 130 to create a more optimal runtime rule and parameter structure 135 for the evaluation engine to process. As described above, the policy opcode for an API call includes one or more rules, with each rule expressing one or more conditions for rejecting (or allowing) the API call. In some embodiments, the optimal runtime rule and parameter 135 structure includes "prepared rules" that are generated by the compiler. Prepared rules are rules that are parsed from the retrieved, compiled and optimized policy opcode that is retrieved by the fetcher for the API call.

In some embodiments, as described above and will be further described below, the runtime rule and parameter structure 135 also includes any indices generated by the rule compiler. Providing these indices reduces the amount of effort needed to execute the policy. Some embodiments use known processes (e.g., the offline process) to compile and process prepared rules and indices from declarative language code. Some of the known processes are described in Handbook of Automated Reasoning by Alan Robinson and Andrei Voronkov.

Once the rule compiler creates the more optimal rule structure, it notifies the evaluation engine 110 directly, in some embodiments, or through the fetcher 115. The evaluation engine then processes the rules and/or indices in this rule structure, according to some embodiments. In some embodiments, the evaluation engine uses the parameters retrieved from the namespace and/or received with the API request to resolve these rules (e.g., conditions specified by the rules).

In some embodiments, after processing the rule structure, the evaluation engine 110 provides its decision with respect to the API call (i.e., the "authorization" or "rejection" of the API call) to the handler 105, which formulates an RPC reply message with this decision in its payload and sends this reply message to the application that sent the request. The evaluation engine in some embodiments stores in the cache 140 a reference to the optimized rule structure that it created. This cached result can be kept as long as the retrieved policy opcode does not change: that way the evaluation engine can skip the parsing/compiling/optimization part (which can be more time consuming) and quickly start executing with minimal effort. As mentioned above, the evaluation engine 110 stores the cached rule structure by using a reference that is associated with one or more parameters that were received with the API call or the API-authorization request.

In some embodiments, in addition to caching the optimized rule structure for an API call's retrieved policy, the policy agent also caches the decisions that it reaches in processing the rule structure for a particular set of parameters. However, as each decision is dependent on the set of parameters that can dynamically change or can resolve the rules differently at different times or under different conditions, the policy agent has to ensure that the previously cached decisions are still valid at a later instance in time when the API call is received again.

In some embodiments, the local agents are used to authorize API calls for both application domain logic and application infrastructure logic, while in other embodiments, the local agents are used to authorize API calls for application infrastructure logic but not application domain logic. Also, decoupling API authorization for infrastructure logic simplifies the application code and allows the application's code to focus on the matters relevant to the application's core functions. This is especially the case because while infrastructure functions are critical, they are not typically a concern of the application domain logic.

For instance, in banking, it is the infrastructure part of the application that is responsible for maintaining micro-services' connections to an account database holding the actual account data (there could many of those), providing the necessary HTTP facilities to allow the customers' browsers to retrieve their account contents (customers would expect SSL, for instance), as well as providing connectivity between micro-services (modern applications include several micro-services which then together form the application).

Both core logic and infrastructure parts require authorization in their operations. However, the type of authorization implemented is different: core logic implements authorization decisions over the core data and operations, while the infrastructure parts implement authorization decisions for the functionality they provide.

This implies that core logic is likely to implement authorization decisions that are fundamentally tied to the logic being implemented. For instance, in banking, there are restrictions about the mortgage offer approvals, between which account transfers can be moved without further security inspection (bank internal transfers are less risky compared to transfers to other banks), or between which kind of accounts fund transfers are allowed to begin with (a savings account could have restrictions for the number of transfers done per month). Even the size of the transfer itself is likely to affect the authorization decision.

Similarly in healthcare, the core logic is the one that is responsible for health care data and operations over it: creation and filling prescription is likely to involve several authorization steps that are tied to the processing of the prescription data. For instance, heavy painkillers are likely to have more strict authorization logic in place to allow the creation of the prescription to begin with.

On the contrary, authorization within the infrastructure parts of the application and micro-service revolve around the infrastructure level entities. The authorization decisions are about whether a micro-service can talk to another, which micro-service API calls can invoke, or whether a micro-service can open a connection to a particular database instance and read a particular table. For business logic, these are low-level details that are typically invisible to the end user.

Application infrastructure level authorization is also relevant and related to the managing of the application and micro-service as whole. For example, a micro-service instance might run inside a VM and the type of a micro-service is likely to affect who (and when) can access the VM. For instance, it is common to block all access by default and allow access only as-needed basis. In that case only the people actively resolving an incident related to application are allowed to access the VM and hence the application deployment. While this does not concern the application instance itself (a process running a micro-service instance is not responsible for managing the VM the process runs within), these authorization decisions can be considered to be part of application infrastructure authorization.

As mentioned above, the server set 150 in some embodiments collects and updates parameters for resolving policies dynamically and in a deployment specific manner (i.e., in a manner that can be context specific for each set of associated machines for which the server set is deployed). This allows policies to be resolved based on conditions and dynamically changing parameters that are specific to each deployment. As further described below, the server set allows the values for policy operands to dynamically change because it allows local agents to receive (through push operations or pull operations) such changes for the policy operands in the respective namespaces of the local agents.

Figure 1B:
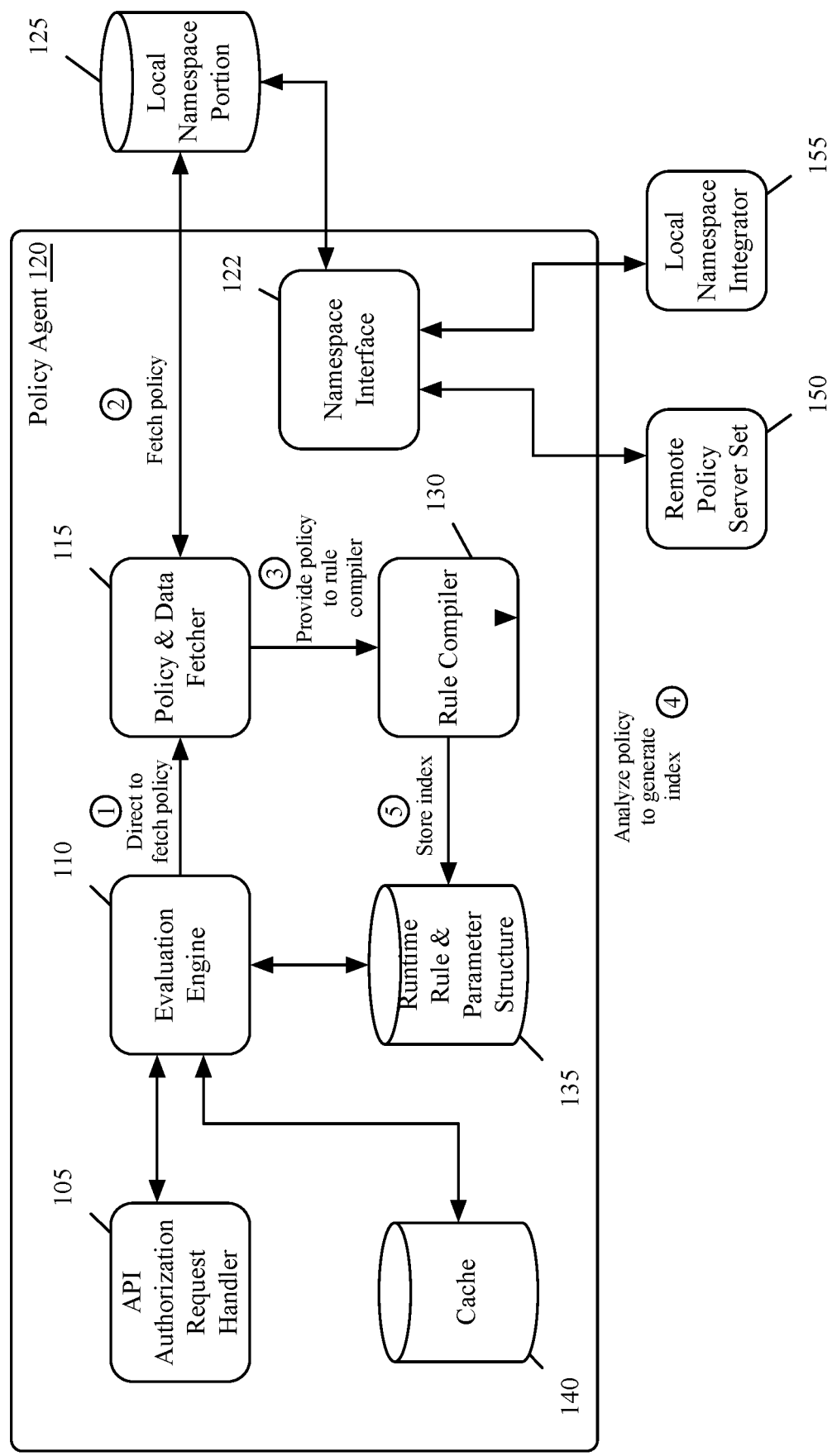
Figure 2:
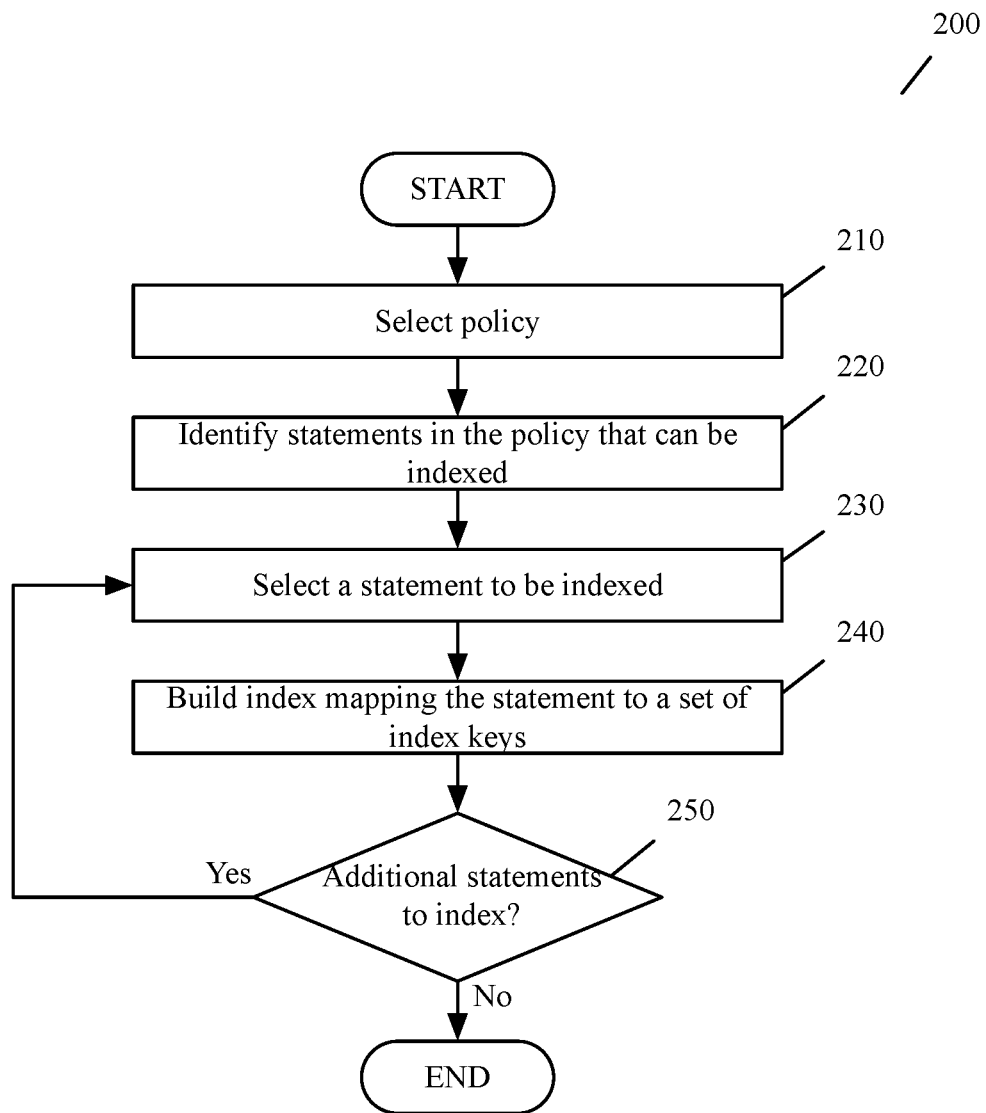
FIG. 2 illustrates an offline process performed by the policy agent in some embodiments.

FIG. 1B illustrates the policy agent 120 as it performs the offline process as mentioned above. In some embodiments, the policy agent 120 continuously performs this offline process to ensure that the runtime rule and parameter storage 135 is kept up-to-date, regardless of whether any requests have been received. Alternatively, or conjunctively, the policy agent in some embodiments performs this process in response to receiving an API-authorization request. FIG. 1B will be further described below with reference to process 200 illustrated in FIG. 2.

To begin the offline process, the policy agent 120 selects (at 210) a policy. As illustrated at the encircled 1, the policy and data fetcher 115 fetches a policy from the local namespace portion 125. As described above, the local namespace portion in some embodiments stores both policy opcodes and operands (e.g., parameters) for evaluating the policy opcodes. Thus, in some embodiments, the policy and data fetcher 115 also fetches a set of operands that are stored along with the policy opcode in the local namespace to use as input for the policy opcode. In some embodiments, after retrieving the policy opcode and operands, the policy and data fetcher 115 provides them to the rule compiler 130 (e.g., at the encircled 2).

Next, the process identifies (at 220) one or more statements in the policy that can be indexed. In some embodiments, these statements are identified based on whether they match a particular pattern. Identifying patterns, in some embodiments, includes analyzing the policy to identify bindings and roles that match the input. The process then selects (at 230) a statement to be indexed, and generates (at 240) an index that maps each statement to a set of index keys. In some embodiments, the index keys correspond to names of variables in the statement. As illustrated by the policy agent 120, the rule compiler 130 performs a process (at the encircled 3) to generate an index to map statements in the policy to a set of index keys corresponding to variables in the policy.

After the statement has been indexed, the process determines (at 250) whether there are additional statements in the policy to index. Any given policy may include no indexable statements, or a multitude of indexable statements, according to some embodiments. When the process determines that there are additional statements to index, the process transitions back to 230 to select a statement to be indexed. Otherwise, when the process determines that there are no additional statements to index, the process ends. In some embodiments, after all of the statements of a policy have been indexed, the rule compiler 130 stores the generated index in the runtime rule and parameter structure 135 for later retrieval, as described above.

Figure 1C:
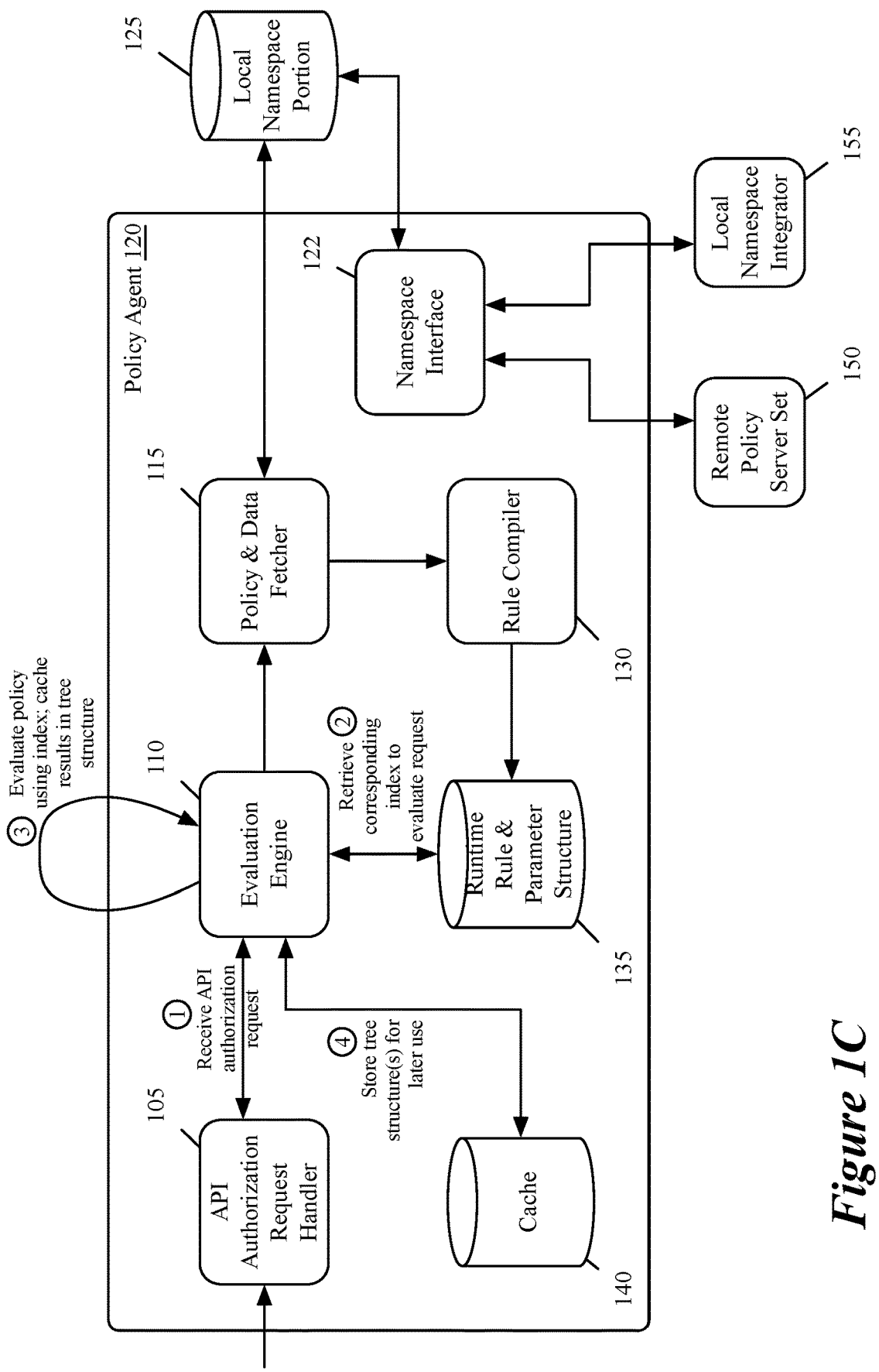
Figure 3:
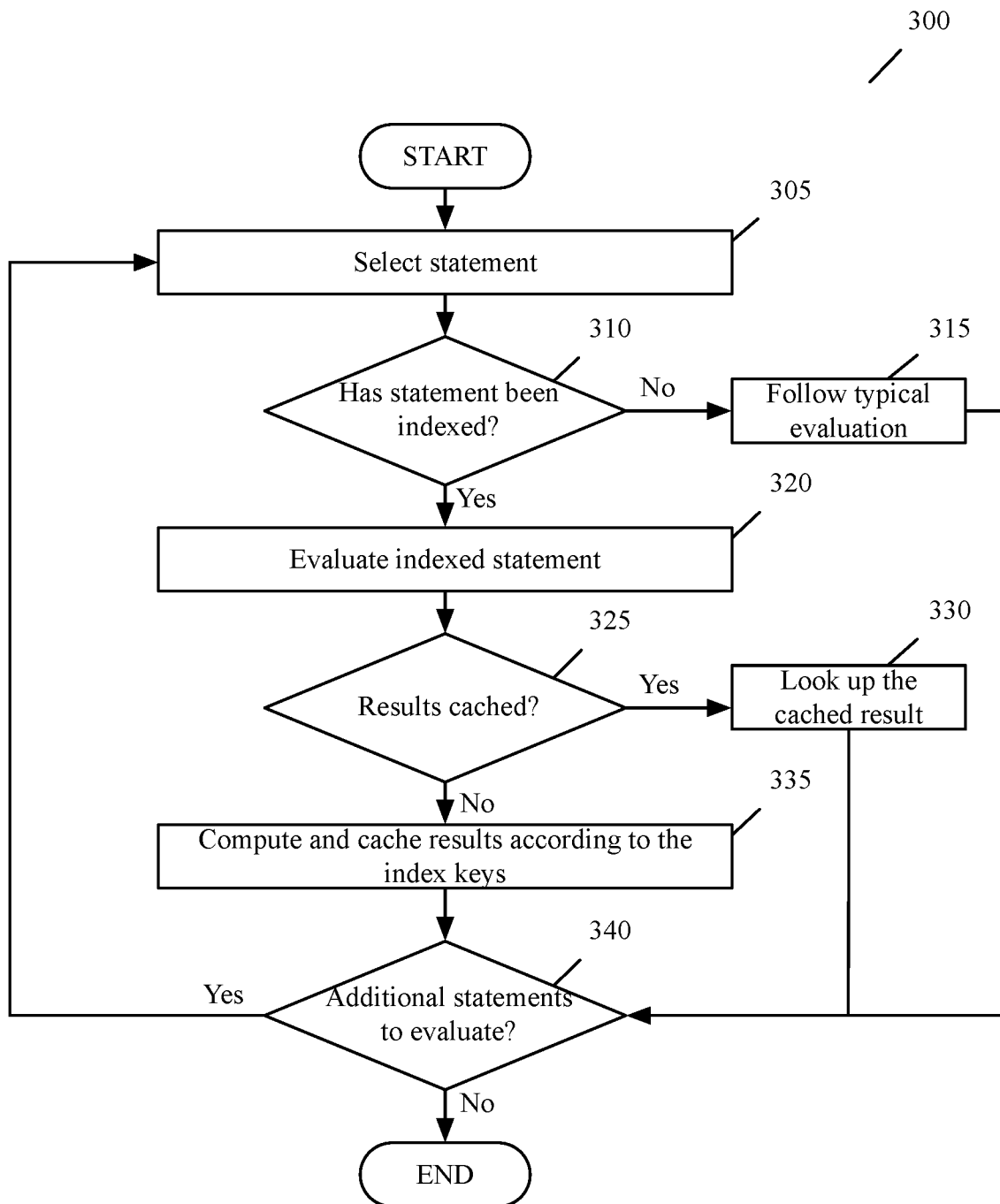
FIG. 3 illustrates an online process performed by the policy agent in some embodiments.

FIG. 1C illustrates the policy agent 120 as it performs the online process, according to some embodiments. As the policy agent may be continuously performing the offline process, the online process in some embodiments is performed concurrently with the offline process. FIG. 1C will be described below with reference to process 300 in FIG. 3. The process 300 is performed by the evaluation agent 110, according to some embodiments.

As shown, the process 300 starts at 305 by selecting a statement (i.e., a statement from policy opcode for evaluating an API-authorization request). Next, at 310, the process determines whether the statement has been indexed. For example, in some embodiments, the evaluation engine 110 checks the runtime rule and parameter storage 135 for an index corresponding to the API-authorization policy it is using to evaluate an API-authorization request. When the evaluation engine determines that no statements from the policy have been indexed (i.e., no such corresponding indices are stored in the runtime rule and parameter storage 135), the process transitions to 315 to follow a typical API-authorization policy evaluation (e.g., as described above with reference to FIG. 1A).

Otherwise, when the process determines (at 310) that the statement has been indexed, the process transitions to 320 to evaluate the indexed statement. For example, the evaluation engine 110 retrieves the index at the encircled 2 and uses the retrieved index to evaluate each statement in the policy opcode at the encircled 3. As described above, the evaluation engine evaluates each statement in full based on available input, which may include operands that were stored with the policy opcode, as well as operands extracted from the API-authorization request (e.g., five-tuple data).

Once the statement has been evaluated, the process determines (at 325) whether results for evaluating the statement have be previously stored in a cache accessible to the evaluation engine. For instance, in some embodiments, the evaluation engine 110 checks the cache 140 to determine if previous results have already been stored. In some embodiments, the results of evaluations for each statement in a given policy are cached in separate tree structures. The tree structures in some embodiments include subtrees for each variable in the statement, and leaves for the possible values of those variables. Examples of these tree structures will be provided in further detail below with reference to FIG. 4A-4D.

When the process determines (at 325) that the results have been cached (i.e., tree structures have been previously computed and stored), the process transitions to 330 to look up the cached results. The evaluation engine 110, for example, may look up one or more tree structures corresponding to one or more statements in a policy, and traverse each tree structure to identify specific values for variables in the statements based on the input available. The process then transitions to 340 to determine whether there are additional statements to evaluate.

Otherwise, when the process determines at 325 that results for the indexed statement are not cached, the process transitions to 335 to compute and cache results according to the index keys. In some embodiments, as mentioned above, the results are used to generate tree structures which are then stored in a cache accessible to the evaluation engine for later retrieval and use. For example, the evaluation engine 110 is illustrated at the encircled 4 as storing the tree structure(s) in the cache 140 for later use. In some embodiments, the runtime rule and parameter structure 135 and the cache 140 are a single storage structure used by both the rule compiler 130 and the evaluation engine 110.

Next, the process determines (at 340) whether there are additional statements in the policy to evaluate. When the process determines that there are additional statements to evaluate, the process transitions back to 305 to select a statement. Otherwise, when the process determines that there are no additional statements to evaluate, the process ends. While not shown, the evaluation engine in some embodiments is continuously processing and evaluating API-authorization requests and policies, as described above.

In some embodiments, as mentioned above, the server set (150) allows for policies to be custom defined in terms of different sets of parameters for different sets of applications that are used in the different deployment settings in which the server set is employed (e.g., for different tenants in a multi-tenant datacenter or different departments or divisions of a multi-department or multi-division entity). In one example, a user may define a policy to limit the number of ports per interface per server that can be exposed by a tenant. In order to implement such a policy, some embodiments aggregate the port values by the interface names.

Figure 4A:
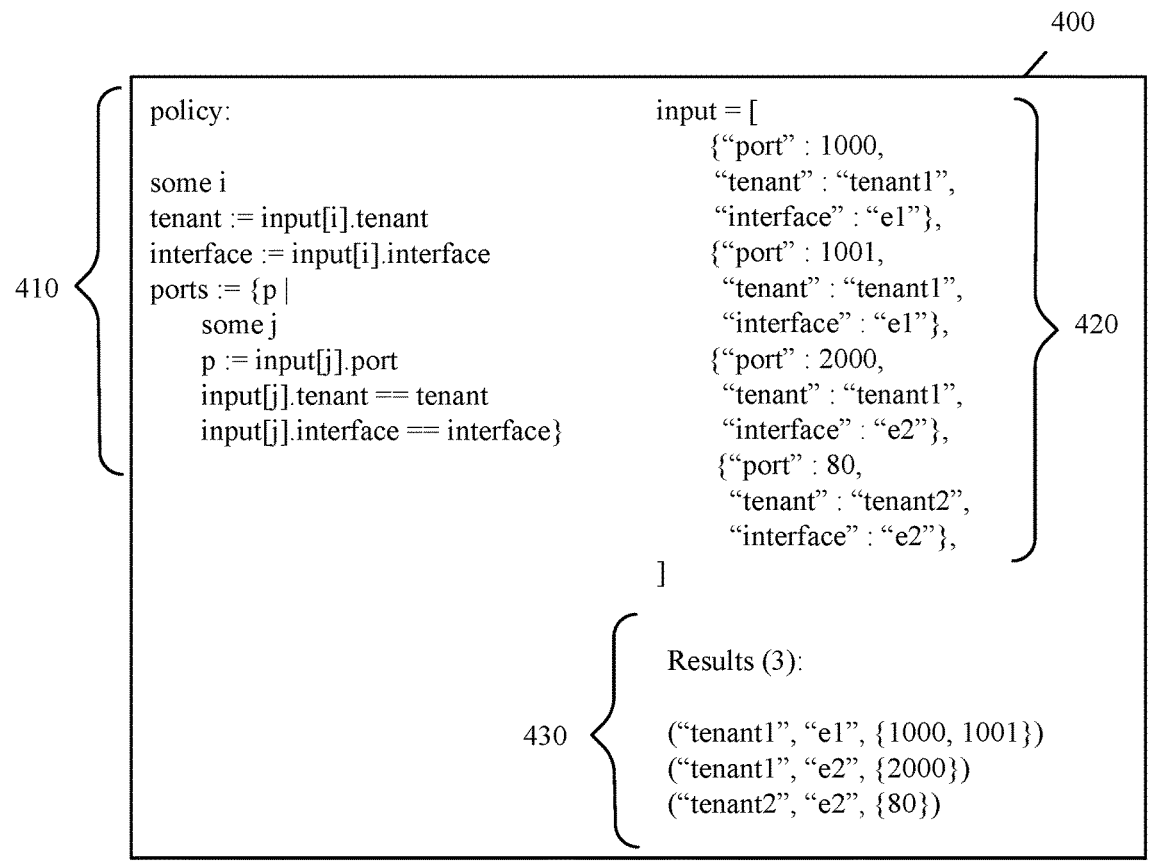
FIGS. 4A-4D conceptually illustrate a user interface and the structures generated by the policy agent as it performs the offline and online processes, according to some embodiments.

FIG. 4A illustrates a user interface (UI) 400 that is displaying a policy 410, a set of input 420, and a set of results 430. As shown, the policy 410 specifies that for some input index "i", to look up a corresponding tenant interface for that input index, and to then compute and aggregate the ports for those tenant and interface values. Next, in order to perform the computation and aggregation, the policy specifies that for some "j", to look up a port at that index "j", and match it to the tenant and the interface by expanding outward from the port. When the policy 410 is run using the set of input 420, which includes a list of ports for each tenant interface pair, the output would be something similar to the results 430 showing a total of four (4) ports between three (3) different tenant/interface pairs.

Figure 4B:
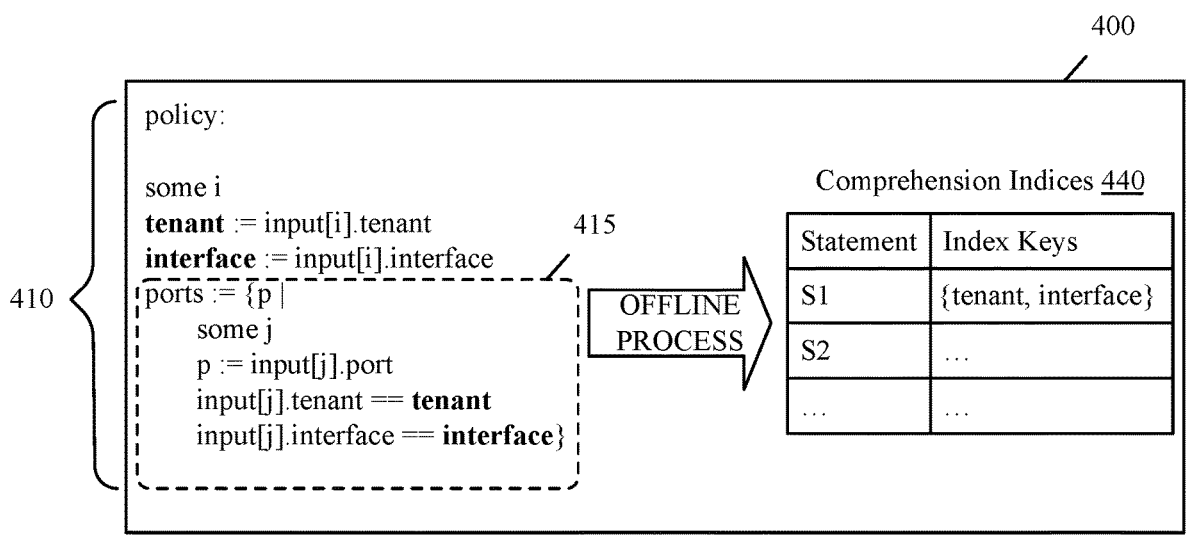

FIG. 4B illustrates the UI 400 with an example comprehension index generated by performing the offline process, according to some embodiments. During the offline process the policy agent (i.e., components thereof) analyzes the policy and the underlying code to identify any statements that can be indexed. As shown, the statement 415 is identified as a statement that can be indexed. As such, the comprehension index 440 includes the statement "S1" mapped to index keys "{tenant, interface}". While this specific example only includes one indexable statement in the policy, other policies may include any number of indexable statements and associated index keys.

Figure 4C:
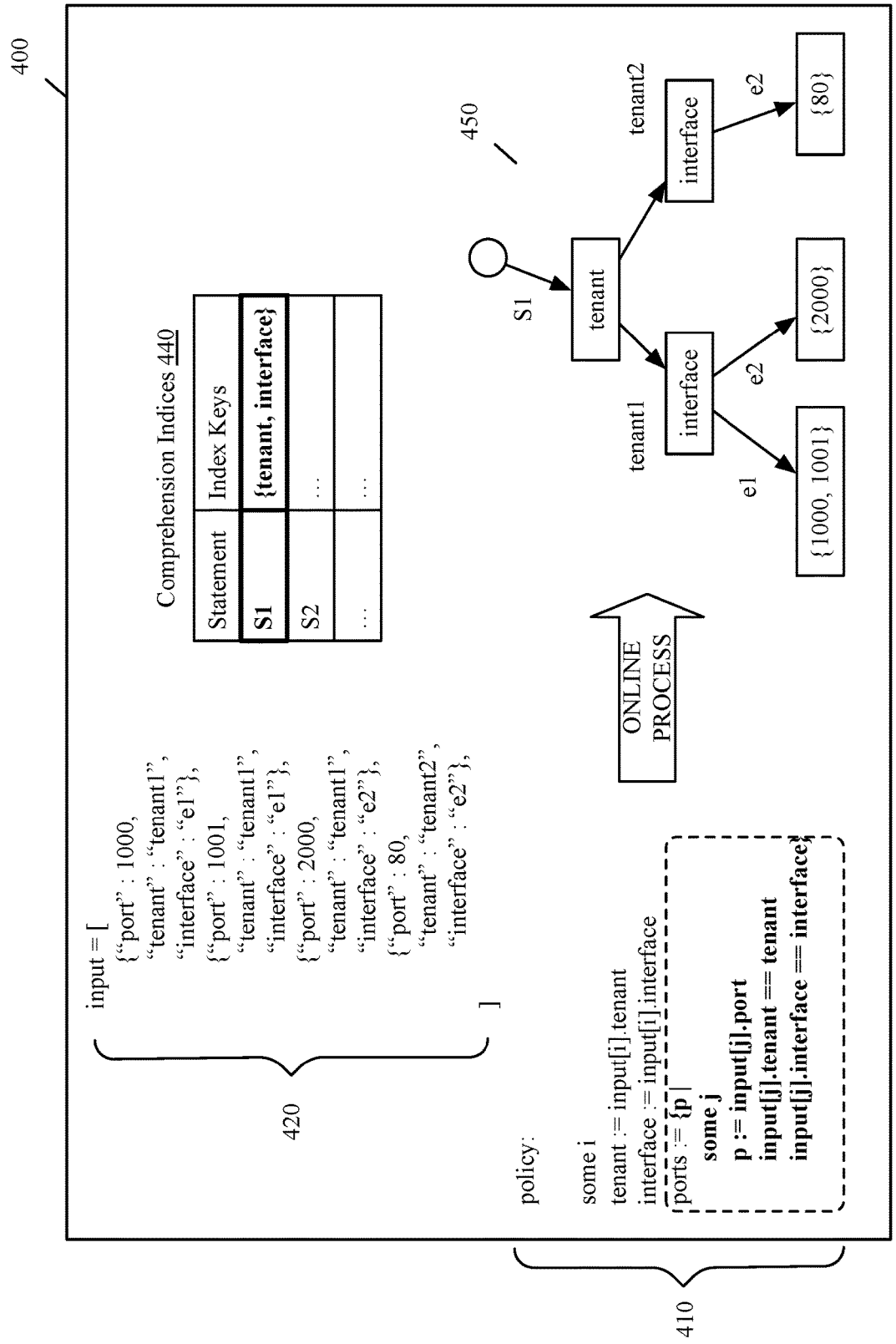

FIG. 4C illustrates the UI 400 after the first part of the online process has been performed to generate a tree structure 450 for the S1 statement identified in the policy 410. The tree structure 450 is organized based on the index keys, with the first node of the tree specifying the first variable, tenant, from which two branches, corresponding to the tenants "acme" and "example", extend. Each of the tenants includes additional branches corresponding to the interfaces of those tenants. As shown, the "acme" tenant's interface has two branches for acme's two interfaces (e1 and e2), while the "example" tenant's interface has a single branch for the example's one interface (e2). Additionally, while each of the e2 interfaces of the tenants "acme" and "example" include single ports {2000} and {80}, respectively, the e1 interface of acme includes two ports {1000, 1001}.

Figure 4D:
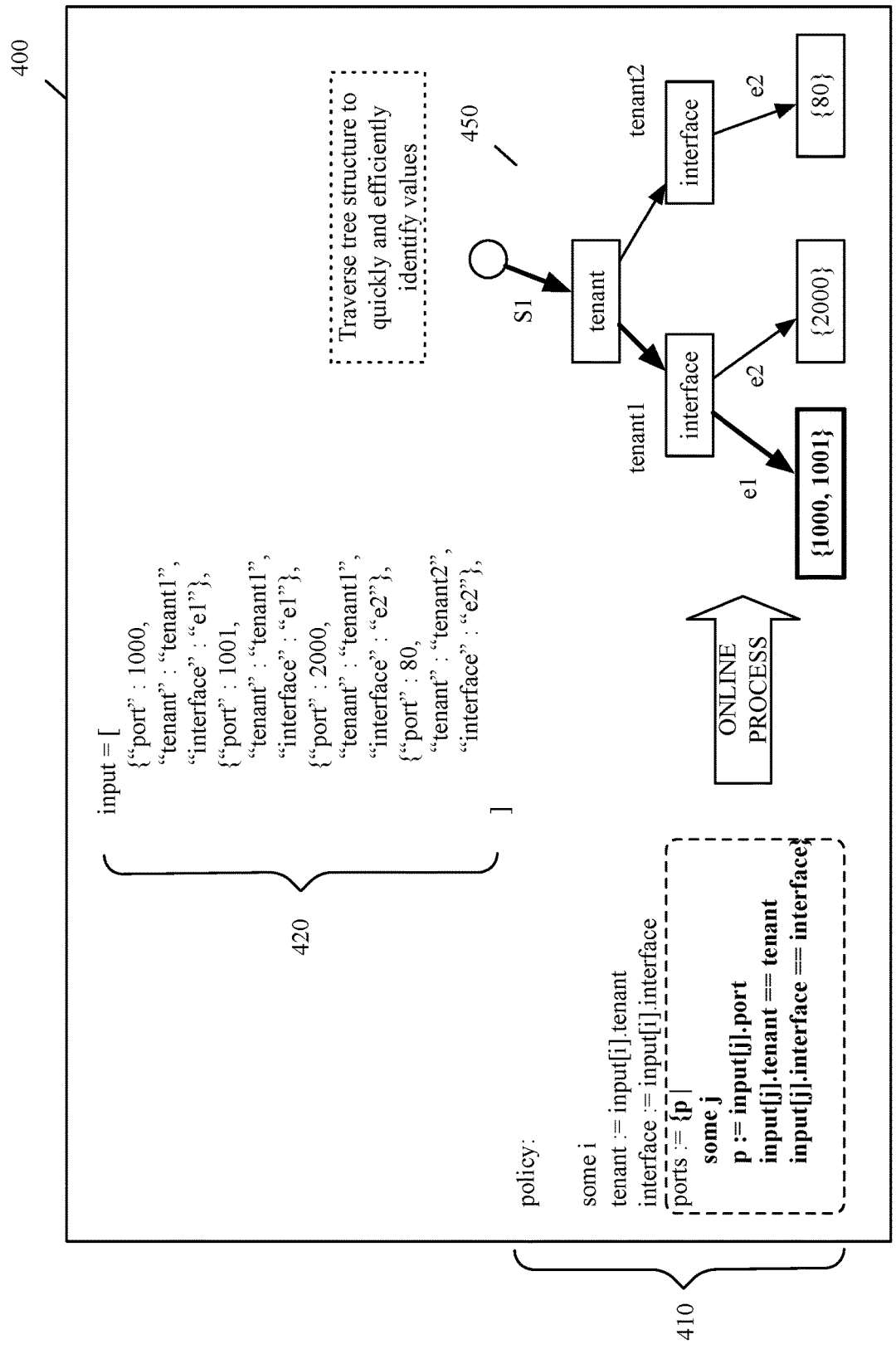

FIG. 4D illustrates the UI 400 and how the tree structure 450 can be used to quickly evaluate the policy. For example, if a policy were to specify that no tenant interface can expose more than 4 ports, the tree structure 450 could easily be traversed to identify the number of ports exposed on each tenant interface, and the names of same. In this example, the branches leading to ports {1000, 1001} of acme's e1 interface appear bolded to demonstrate the quick path to identifying both the number of ports exposed, and which specific ports are exposed. As such, if a user were to define a policy to limit the number of exposed ports to, e.g., four exposed ports per interface, the tree structure would allow the evaluation engine to quickly determine whether any of the tenants and/or their interfaces are out of compliance with this policy, and identify the specific ports that are of issue.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
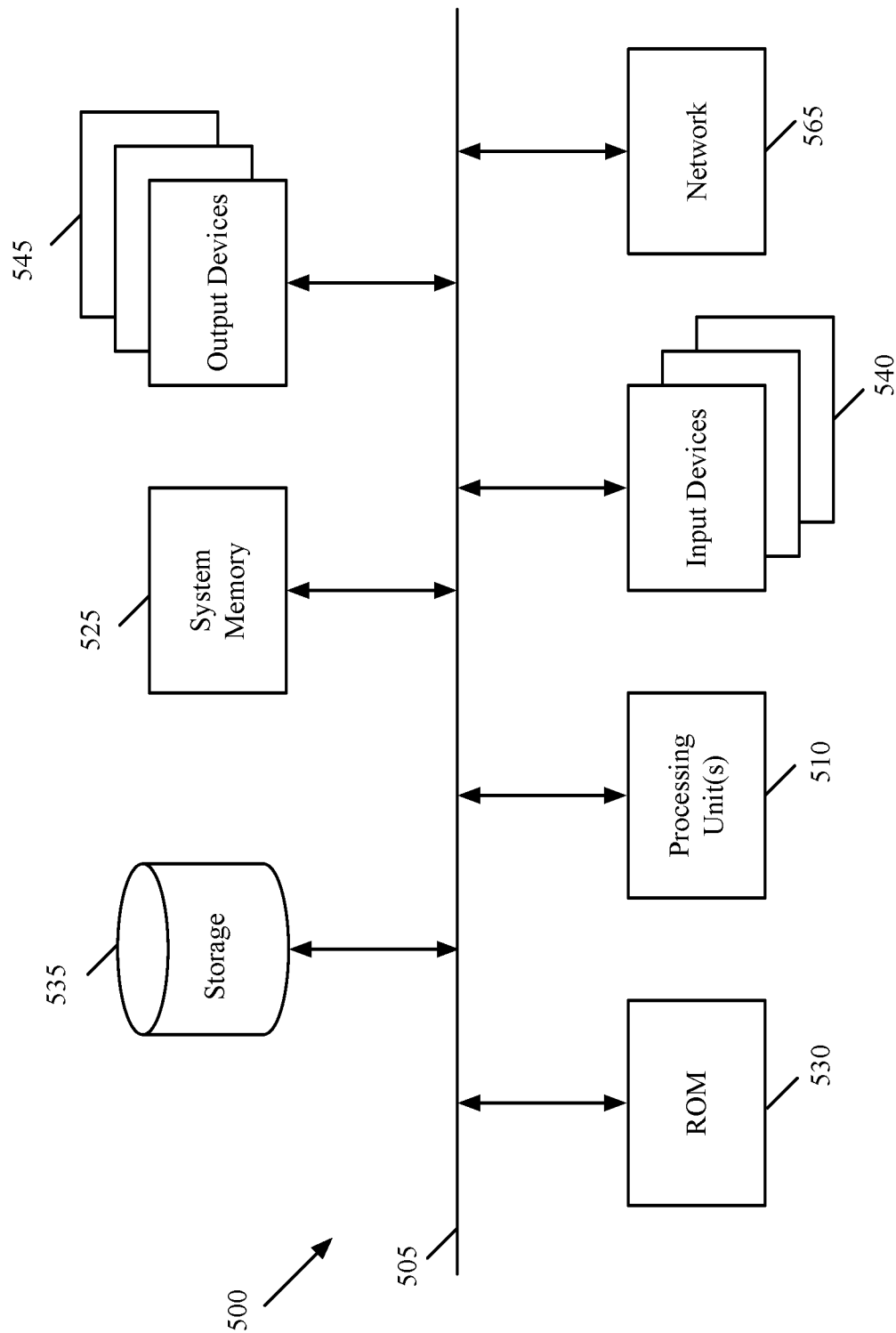
FIG. 5 conceptually illustrates an electronic system with which some embodiments of the invention are implemented.

FIG. 5 conceptually illustrates an electronic system 500 with which some embodiments of the invention are implemented. The electronic system 500 may be a computer (e.g., a desktop computer, personal computer, tablet computer, server computer, mainframe, a blade computer etc.), phone, PDA, or any other sort of electronic device. The electronic system 500 is also the control plane modules of the load balancer of some embodiments. As shown, the electronic system includes various types of computer readable media and interfaces for various other types of computer readable media. Specifically, the electronic system 500 includes a bus 505, processing unit(s) 510, a system memory 525, a read-only memory 530, a permanent storage device 535, input devices 540, and output devices 545.

The bus 505 collectively represents all system, peripheral, and chipset buses that communicatively connect the numerous internal devices of the electronic system 500. For instance, the bus 505 communicatively connects the processing unit(s) 510 with the read-only memory (ROM) 530, the system memory 525, and the permanent storage device 535. From these various memory units, the processing unit(s) 510 retrieve instructions to execute and data to process in order to execute the processes of the invention. The processing unit(s) may be a single processor or a multi-core processor in different embodiments.

The ROM 530 stores static data and instructions that are needed by the processing unit(s) 510 and other modules of the electronic system. The permanent storage device 535, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 535.

Other embodiments use a removable storage device (such as a floppy disk, flash drive, etc.) as the permanent storage device. Like the permanent storage device 535, the system memory 525 is a read-and-write memory device. However, unlike storage device 535, the system memory is a volatile read-and-write memory, such a random access memory. The system memory stores some of the instructions and data that the processor needs at runtime. In some embodiments, the invention's processes are stored in the system memory 525, the permanent storage device 535, and/or the read-only memory 530. From these various memory units, the processing unit(s) 510 retrieve instructions to execute and data to process in order to execute the processes of some embodiments.

The bus 505 also connects to the input and output devices 540 and 545. The input devices enable the user to communicate information and select commands to the electronic system. The input devices 540 include alphanumeric keyboards and pointing devices (also called "cursor control devices"). The output devices 545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 5, bus 505 also couples electronic system 500 to a network 565 through a network adapter (not shown). In this manner, the computer can be a part of a network of computers (such as a local area network ("LAN"), a wide area network ("WAN"), or an Intranet, or a network of networks, such as the Internet. Any or all components of electronic system 500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures conceptually illustrate processes (e.g., FIGS. 2-3). The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Therefore, one of ordinary skill in the art would understand that the invention is not to be limited by the foregoing illustrative details, but rather is to be defined by the appended claims.

The invention claimed is:

1. For a policy agent that executes on a host computer to process API-authorization requests from at least one application executing on the host computer, a method for optimizing performance for policies that perform search operations on datasets, the method comprising:
for a particular API-authorization policy, performing an offline first process (i) to identify one or more statements in the particular API-authorization policy that can be indexed and (ii) to generate an index for the particular API-authorization policy to map each identified statement to a set of associated index keys,
wherein the particular API-authorization policy is retrieved from a local namespace by a policy fetching component of the policy agent based on instructions from an evaluation engine of the policy agent; and
for each statement in the generated index, performing an online second process (i) to evaluate the statement using available input data and (ii) to generate a tree structure comprising results of the evaluation, wherein the tree structure is keyed by the set of associated index keys from the index.

2. The method of claim 1, wherein the set of associated index keys correspond to names of variables in the particular API-authorization policy.

3. The method of claim 1, wherein the set of associated index keys are organized in a deterministic order.

4. The method of claim 1, wherein performing the first process to identify one or more statements in the particular API-authorization policy that can be indexed comprises analyzing the particular policy to identify statements that match a particular pattern.

5. For a policy agent that executes on a host computer to process API-authorization requests from at least one application executing on the host computer, a method for optimizing performance for policies that perform search operations on datasets, the method comprising:
for a particular API-authorization policy, performing an offline first process (i) to identify one or more statements in the particular API-authorization policy that can be indexed and (ii) to generate an index for the particular API-authorization policy to map each identified statement to a set of associated index keys; and
for each statement in the generated index, performing an online second process (i) to evaluate the statement using available input data and (ii) to generate a tree structure comprising results of the evaluation, wherein the tree structure is keyed by the set of associated index keys from the index,
wherein the particular API-authorization policy is a first API-authorization policy in a plurality of API-authorization policies that are indexed, wherein performing the second process further comprises:
receiving an API-authorization request from the application executing on the host computer;
retrieving a second API-authorization policy for evaluating the API-authorization request;
determining that one or more statements in the second API-authorization policy have been indexed; and
retrieving one or more tree structures corresponding to the one or more indexed statements in order to look up values for variables in the second API-authorization policy for evaluating the second API-authorization policy.

6. The method of claim 1, wherein the policy agent builds a tree structure for each statement in the particular API-authorization policy once.

7. The method of claim 1, wherein performing the second process to evaluate each statement comprises evaluating each statement in full using the available input data.

8. The method of claim 1, wherein the tree structure comprises (i) subtrees for each variable in the statement and (ii) leaves corresponding to possible values of each variable.

9. The method of claim 1,
wherein the policy fetching component provides the retrieved policy to a rule compiling component of the policy agent,
wherein the rule compiling component (i) performs the offline first process (ii) caches the index a first storage structure.

10. The method of claim 9, wherein the evaluation engine (i) retrieves the cached index from the first storage structure to evaluate the particular policy and (ii) generates corresponding tree structures to cache in a second storage structure.

11. A non-transitory machine readable medium storing a comprehension indexing program for execution by at least one processing unit, the program for optimizing performance for policies that perform search operations on datasets, the program comprising sets of instructions for:
performing, for a particular API-authorization policy, an offline first process (i) to identify one or more statements in the particular API-authorization policy that can be indexed and (ii) to generate an index for the particular API-authorization policy to map each identified statement to a set of associated index keys; and
for each statement in the generated index, performing an online second process (i) to evaluate the statement using available input data and (ii) to generate a tree structure comprising results of the evaluation, wherein the tree structure is keyed by the set of associated index keys from the index,
wherein the particular API-authorization policy is a first API-authorization policy in a plurality of API-authorization policies that are indexed, wherein the set of instructions for performing the second process further comprises sets of instructions for:

receiving an API-authorization request from the application executing on the host computer;

retrieving a second API-authorization policy for evaluating the API-authorization request;

determining that one or more statements in the second API-authorization policy have been indexed; and retrieving one or more tree structures corresponding to the one or more indexed statements in order to look up values for variables in the second API-authorization policy for evaluating the second API-authorization policy.

12. The non-transitory machine readable medium of claim 11, wherein the set of associated index keys correspond to names of variables in the particular API-authorization policy.

13. The non-transitory machine readable medium of claim 11, wherein the set of associated index keys are organized in a deterministic order.

14. The non-transitory machine readable medium of claim 11, wherein the set of instructions for performing the first process to identify one or more statements in the particular API-authorization policy that can be indexed comprises a set of instructions for analyzing the particular API-authorization policy to identify statements that match a particular pattern.

15. The non-transitory machine readable medium of claim 11, wherein a tree structure is built for each statement in the particular API-authorization policy once.

16. The non-transitory machine readable medium of claim 11, wherein the set of instructions for performing the second process to evaluate each statement further comprises a set of instructions for evaluating each statement in full using the available input data.

17. The non-transitory machine readable medium of claim 11, wherein the tree structure comprises (i) subtrees for each variable in the statement and (ii) leaves corresponding to possible values of each variable.

\* \* \* \* \*